Nov. 23, 1965  M. MAYRATH  3,219,178
FLOATING AUGER FLIGHT FOR CONVEYORS
Filed July 2, 1962
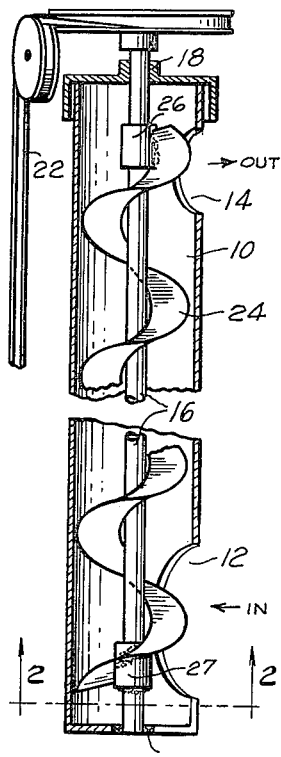
Fig. 1
Fig. 2
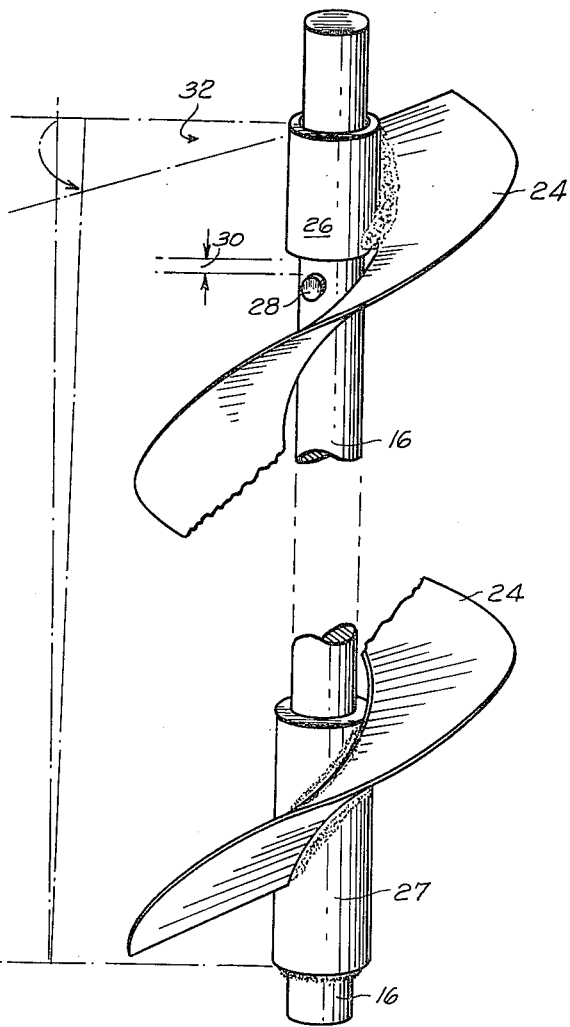
Fig. 3
Martin Mayrath
INVENTOR
By: Homer R. Montague
ATTY.

United States Patent Office 3,219,178
Patented Nov. 23, 1965

3,219,178
FLOATING AUGER FLIGHT FOR CONVEYORS
Martin Mayrath, 10707 Lennox Lane, Dallas, Tex.
Filed July 2, 1962, Ser. No. 206,800
3 Claims. (Cl. 198—213)

The present invention is based on the discovery that a superior form of conveyor auger is provided by dispensing with the welding (and other securement) of the helical or helicoid flight about the shaft for a major portion of its length, and by providing certain other design features detailed below.

It is accordingly a principal object of the invention to provide an auger conveyor having improved torsion-distribution features to take up sudden loads (such as during start-up or when a jam occurs in the fluent material), yet at reduced cost as compared with known constructions.

A further object of the invention is to provide an auger conveyor in which practically the entire length of the auger shaft is free to respond in torsion to the driving force and the load resistance, but without danger of axial misalignment such as might damage the shaft or the flight.

The above and other objects and advantages of the invention are attained by a construction in which the helical auger flight is secured at one end to a sleeve or collar loosely rotatable about the auger shaft adjacent the driven (power input) end of the latter, and secured rigidly to the shaft only near the opposite end thereof. No welding or other securement of the flight to the shaft is provided in the intervening portions. A stop lug or lugs is secured to the shaft just inside the inner face of the sleeve or collar, so as to define a minimum "collapsed" length for the helical flight, but this stop does not interfere with free rotation of the sleeve about the shaft. The general length of the helical flight is thus free for limited lateral and axial motion relative to the shaft, but still generally restricts the shaft against excessive eccentricity.

The invention will best be understood by reference to the following specification of a preferred form thereof, taken in connection with the appended drawings, in which:

FIG. 1 is a longitudinal sectional view of a typical conveyor incorporating the invention.

FIG. 2 is a sectional view taken on line 2—2 thereof.

FIG. 3 is a view of the auger flight and shaft to a larger scale, parts being broken away from the midsection thereof.

In FIGS. 1 and 2, numeral 10 designates a tubular auger casing of sheet metal or the like, having a material inlet at 12 and an outlet as at 14. Near each end a bearing for shaft 16 is provided, these being indicated merely schematically at 18 and 20, as the inlet and outlet details are not important with respect to the present invention.

Shaft 16 is arranged to be power driven adjacent the conveyor outlet end, as by a pulley arrangement and the usual V-belt 22. Within this end of the housing 10, one end of the edge-wound helical auger ribbon 24 is welded to a sleeve 26 loosely surrounding shaft 16, and the other end of flight 24 is secured to the other end of shaft 16 as by welding to the shaft or to another sleeve 27 in turn welded or bolted fast to the shaft. The intervening convolutions of flight 24 are not secured to the shaft at all, but pass loosely thereabout.

The rest-length of the auger flight measured along its central axis is principally established during its fabrication. However, as shown in FIG. 3, a stop lug or lugs, or a bolt head, is secured to shaft 16 at 28 to define a limit to the retraction of sleeve 26 under load. This stop may in fact contact the sleeve face with the machine at rest, but if not, the contact (motion indicated at 30) will occur under load. FIG. 3 indicates at 32 the angular deflection of the "free" end of the shaft relative to sleeve 26, or vice versa, which results from the fact that the driving torque is uniformly distributed along the length of shaft 16 between sleeves 26 and 27. Flight 24 may also undergo some angular deflection under load, but in any event it serves to stabilize the axial position of the shaft in the casing, and prevents undue eccentricity thereof.

Conveyors of this type may be from 10 feet up in length, and for a typical steel shaft diameter of one inch (say), the torsion relief is of great value in easing strain when starting the conveyor, especially when it is full so there is substantial resistance to auger rotation. Similar strains sometimes result from jamming of the fluent material (such as grain), or from stones in the material, or even merely from surges in the flow.

Thus, without being bound to any detailed theory of the operation, it appears that torsion distribution in both shaft and flight occur under overload or shock conditions as well as during normal operation, and a degree of longitudinal freedom in the flight is also present.

I am aware that sections of auger flighting have occasionally been left free of attachment to their central shafts for limited intervals; for example where a degree of over-all length adjustment is provided by telescoping shaft sections, and for other purposes. The invention is distinct from such prior proposals, which are not intended to (and do not in fact) achieve the special advantages of the construction described herein.

The invention has been disclosed in connection with a preferred embodiment for purposes of explanation to those skilled in the art, but the details of that embodiment are not intended as limiting the scope of the invention except to the extent required by the appended claims.

What is claimed is:

1. In an auger conveyor, an auger casing, a one-piece shaft in said casing having a driving connection at one end thereof, a helical ribbon conveyor flight of constant pitch and diameter secured at one of its ends to said shaft at the opposite end of the latter and extending loosely about said shaft toward the driving connection; and a sleeve slidably and rotatably encircling said shaft adjacent said driving connection, for limited rotation and axial displacement relative to said shaft; the other end of said flight being secured to said sleeve.

2. An auger conveyor in accordance with claim 1, and a stop lug on said shaft inside the inner edge of said sleeve, to define a limiting retraction distance for said flight.

3. An auger conveyor in accordance with claim 1, and means for applying a driving torque to said auger shaft at said driving connection.

References Cited by the Examiner

UNITED STATES PATENTS

| | | | |
|---|---|---|---|
| 1,818,055 | 8/1931 | Elliott | 198—213 |
| 2,845,167 | 7/1958 | Heiken | 198—213 |

FOREIGN PATENTS

No. 96 Vol. 9  9/1863  Sardinia.
      804     6/1887  Sweden.

SAMUEL F. COLEMAN, *Primary Examiner.*

WILLIAM B. LA BORDE, ERNEST A. FALLER,
*Examiners.*